United States Patent [19]  
Suzuki et al.

[11] Patent Number: 4,788,642  
[45] Date of Patent: Nov. 29, 1988

[54] DATA CONTROL SYSTEM ALLOWING SIMULTANEOUS COMMUNICATION BETWEEN A HOST AND A PLURALITY OF PERIPHERALS OVER PREDETERMINED BIT LINES

[75] Inventors: Satio Suzuki; Yasuhito Kawakita; Koichi Kaneko, all of Hamamatsu, Japan

[73] Assignee: Nippon Gakki Seizo Kabushiki Kaisha, Hamamatsu, Japan

[21] Appl. No.: 886,527

[22] Filed: Jul. 16, 1986

[30] Foreign Application Priority Data

Jul. 19, 1985 [JP] Japan ................... 60-159981

[51] Int. Cl.$^4$ .................. G06F 13/40; G06F 13/42
[52] U.S. Cl. ............................................. 364/200
[58] Field of Search ... 364/200 MS File, 900 MS File; 340/825.52

[56] References Cited

U.S. PATENT DOCUMENTS

| 3,644,901 | 2/1972 | Zingg | 364/900 |
| 4,079,452 | 3/1978 | Larson et al. | 364/200 |
| 4,281,392 | 7/1981 | Grants et al. | 364/900 |

FOREIGN PATENT DOCUMENTS

104545A2  4/1984  European Pat. Off. .

Primary Examiner—Raulfe B. Zache  
Assistant Examiner—Florin Munteanu-Ramnic  
Attorney, Agent, or Firm—Spensley Horn Jubas & Lubitz

[57] ABSTRACT

A bus control system for a common data bus between a central processing unit (CPU) and a plurality of peripheral devices has an address decoder which decodes address data from the CPU to output one of a chip selection signal $S_c$ and a plurality of chip selection signals $S_1$ to $S_n$. The chip selection signal $S_c$ brings all the devices into operative conditions simultaneously, while each of the chip selection signals $S_1$ to $S_n$ brings a respective one of the devices into an operative condition. Each of the devices has a first register which is responsive to a corresponding one of the chip selection signals $S_1$ to $S_n$ to store data appearing on predetermined bit-lines of the data bus and first and second gate circuits. When the CPU causes the address decoder to output the chip selection signal $S_c$ in a write mode, the first gate circuit of each device passes data appearing on the bit-line of the bus designated by the data in the first register into a second register. Thus, the CPU can write data into the second registers of all of the devices simultaneously. When the CPU causes the address decoder to output the chip selection signal $S_c$ in a read mode, the second gate circuit of each device outputs data contained in a third register onto the bit-line of the bus designated by the data in the first register. Thus, the CPU can read data from the third registers of all of the devices simultaneously.

6 Claims, 3 Drawing Sheets

DATA CONTROL SYSTEM ALLOWING SIMULTANEOUS COMMUNICATION BETWEEN A HOST AND A PLURALITY OF PERIPHERALS OVER PREDETERMINED BIT LINES

BACKGROUND OF THE INVENTION

1. Field of the Invention

This invention relates generally to a bus control system suitable for use in a data processing system such as an image processing system, and more particularly to such a bus control system in which a data bus connecting a central processing unit to a plurality of peripheral devices can be efficiently used.

2. Prior Art

It has become common that a data processing system, such as an image processing system, includes a central processing unit (CPU) and a plurality of peripheral devices connected to the CPU through a common data bus. Data processing systems of such a construction are also widely used for other various purposes.

In such data processing systems, an exchange of data between a CPU and a device is performed in such a manner that the CPU first designates the device, with which it exchanges data, by outputting address data or the like, and then transmits to or receives from the designated device data using all bit-lines of the common data bus.

With such arrangement, however, when the CPU transmits to or receives from the designated device data each composed of one bit or several bits at most, that is to say, when the CPU transmits or receives data using only a few bit-lines of the common data bus, the remaining bit-lines of the common data bus become idle, so that the common bus can not efficiently be used. Thus, when the CPU transmits to or receives from a number of devices data each composed of a few bits, the number of transmissions or receptions of data the CPU must effect becomes large in spite of the actual amount of data being small. As a result, the dead time in the transmission and reception of data significantly increases.

SUMMARY OF THE INVENTION

It is therefore an object of the present invention to provide a bus control system in which a common data bus connecting a CPU to peripheral devices can efficiently be used even when the CPU transmits to or receives from the devices data each composed of bits smaller in number than bit-lines of the common data bus.

Another object of the invention is to provide a bus control system in which dead time of the common data bus does not increase even when such a transmission or reception of data is performed.

According to an aspect of the present invention, there is provided a bus control system adapted for use in a data processing system including a central processing unit and a plurality of peripheral devices connected to the central processing unit through a common data bus having a plurality of bit-lines comprising address decoding means for decoding address data fed from the central processing unit to selectively output a commonly selecting signal for bringing all the devices into operative states and a plurality of individually selecting signals each for bringing a respective one of the plurality of devices into an operative state; register means provided in each of the plurality of devices and responsive to a corresponding one of the plurality of individually selecting signals for storing data appearing on predetermined ones of the the bit-lines of the common data bus thereinto; and bit selection means provided in each of the plurality of devices and responsive to the commonly selecting signal for selecting predetermined at least one of the plurality of bit-lines of the common data bus in accordance with the data stored in the register means of the each of the plurality of devices to allow each of the plurality of devices to communicate with the central processing unit through the selected at least one bit-line of the common data bus.

DESCRIPTION OF THE PREFERRED EMBODIMENTS OF THE INVENTION

Figure 1:
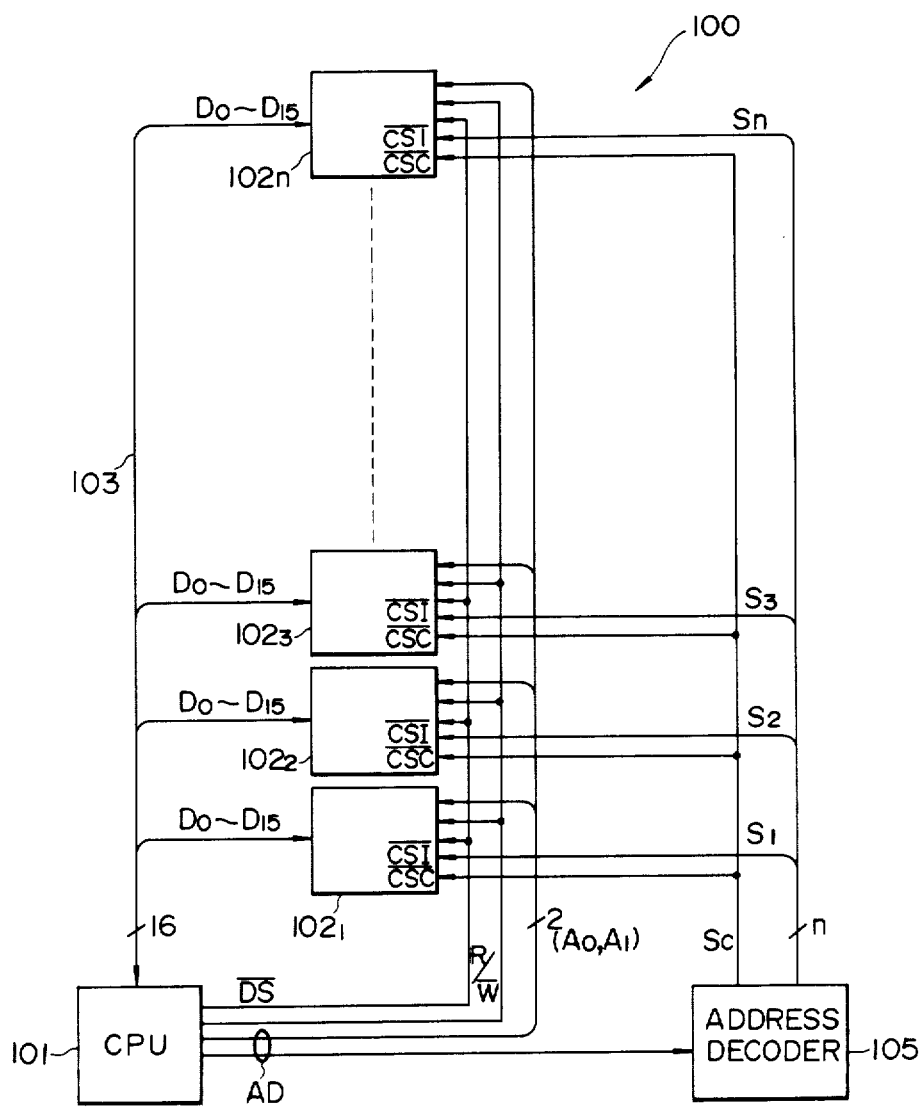
FIG. 1 is a block diagram of a data processing system including a bus control system provided in accordance with the present invention.

Referring now to FIG. 1, there is shown a data processing circuit 100 provided in accordance with the present invention.

The data processing circuit 100 comprises a CPU (central processing unit) 101 for controlling various portions of this data processing circuit 100. The CPU 101 is connected to peripheral devices (or interface circuits) $102_1$ to $102_n$ of an identical construction through a common data bus 103. Each of the devices $102_1$ to $102_n$ has therein memory means for storing data sent from the CPU 101, and is for example a frame buffer memory in an image processing system. The common data bus 103 comprises sixteen bit-lines for respectively sending sixteen bits $D_0$ to $D_{15}$ of each data, and thus, when the CPU 101 transmits to or receives from one of the devices $102_1$ to $102_n$, the transmission or reception of data is performed on a sixteen-bit basis. Each of the devices $102_1$ to $102_n$ has a pair of chip selection terminals (or device selection terminals) $\overline{CSC}$ and $\overline{CSI}$, and is brought into an operative state when a "0" signal is applied to either of the two chip selection terminals $\overline{CSC}$ and $\overline{CSI}$.

The CPU 101 is so constructed as to output address data AD, a read/write control signal $R/\overline{W}$ and a data strobe signal $\overline{DS}$ at required timings as later described. The lower-order two bits $A_0$ and $A_1$ of the address data AD are supplied to the devices $102_1$ to $102_n$, and the remaining bits of the address data AD are supplied to an address decoder 105. The address decoder 105 decodes the remaining bits of the address data AD fed from the CPU 101 to render one of chip selection signals $S_c$ and $S_1$ to $S_n$ active or "0". The chip selection signal $S_c$ is supplied to all of the chip selection terminals $\overline{CSC}$ of the devices $102_1$ to $102_n$, while the chip selection signals $S_1$ to $S_n$ are supplied to chip selection terminals $\overline{CSI}$ of the devices $102_1$ to $102_n$, respectively. As described above, only one of the chip selection signals $S_c$ and $S_1$ to $S_n$ is rendered active at a time. Thus, when the chip selection signal $S_c$ is rendered "0" all of the devices $102_1$ to $102_n$ are brought into operative states, and when one of the chip selection signals $S_1$ to $S_n$ is rendered "0" a corresponding one of the devices $102_1$ to $102_n$ is brought into an operative state.

The data strobe signal $\overline{DS}$ and the read/write control signal R/$\overline{W}$ are supplied together with the lower-order two bits $A_0$ and $A_1$ of the address data AD to all of the devices $102_1$ to $102_n$.

The circuit of the device $102_i$ (i is any one of "1" to "n") will now be more fully described with reference to FIG. 2. As described, the devices $102_1$ to $102_n$ are identical in construction.

Figure 2:
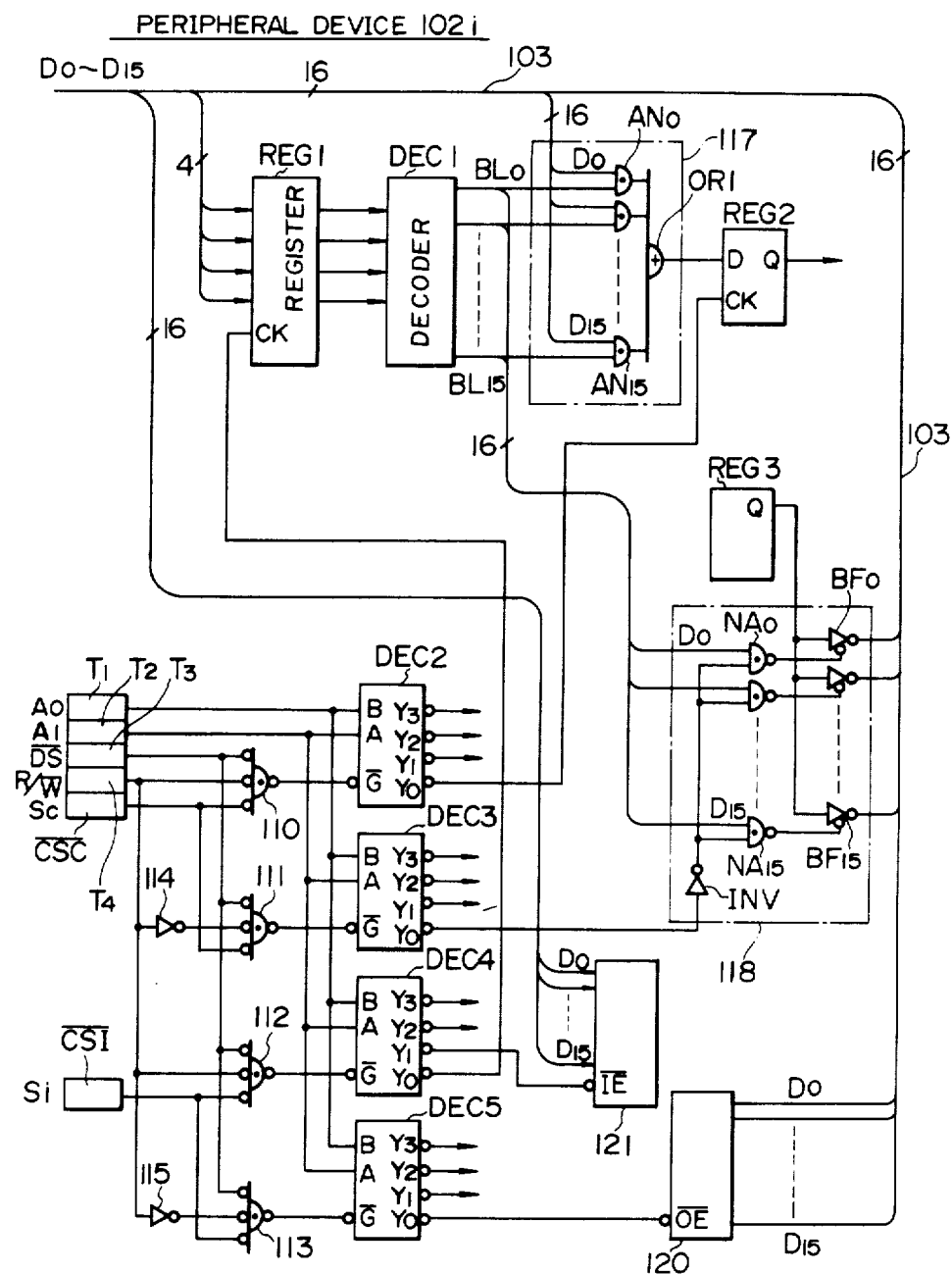
FIG. 2 is a circuit diagram of one of the devices 102 of the data processing system of FIG. 1.

In FIG. 2, the device $102_i$ comprises input terminals $T_1$ and $T_2$, to which the bits $A_0$ and $A_1$ of the address data AD outputted from the CPU 101 (FIG. 1) are supplied, and input terminals $T_3$ and $T_4$ to which the data strobe signal $\overline{DS}$ and the read/write control signal R/$\overline{W}$ are supplied, respectively. The chip selection terminal $\overline{CSC}$ is supplied with the signal $S_c$ and the chip selection terminal $\overline{CSI}$ of this device is supplied with the signal $S_i$, as described above. The bits $A_0$ and $A_1$ fed to the terminals $T_1$ and $T_2$ are supplied to input terminals B and A of four decoders DEC2, DEC3 DEC4 and DEC5 each for decoding the supplied bits $A_0$ and $A_1$ to output a "0" signal from one of four output terminals $Y_0$ to $Y_3$ thereof. The relationship between the input and output signal of each of the decoders DEC2 to DEC5 is shown in Table 1.

TABLE 1

| $A_1$ | $A_0$ | $Y_3$ | $Y_2$ | $Y_1$ | $Y_0$ |
|---|---|---|---|---|---|
| 0 | 0 | 1 | 1 | 1 | 0 |
| 0 | 1 | 1 | 1 | 0 | 1 |
| 1 | 0 | 1 | 0 | 1 | 1 |
| 1 | 1 | 0 | 1 | 1 | 1 |

Each of the decoders DEC2 to DEC5 is so arranged to output its decode result only when a "0" signal is applied to an enabling input terminal $\overline{G}$ thereof. The enabling input terminals $\overline{G}$ of the decoders DEC2 to DEC5 are connected to output terminals of gates 110 to 113, respectively. The read/write control signal R/$\overline{W}$ applied to an input terminal $T_4$ of this device $102_i$ is fed to inverters 114 and 115 which in turn output inverted signals of the signal R/$\overline{W}$ to second input terminals of the gates 111 and 113, respectively. Signal levels of respective output signals of the gates 110 to 113 are determined in accordance with signal levels of the signals $\overline{DS}$, R/$\overline{W}$, $S_c$ and $S_i$, as follows.

(i) Gate 110

The output signal of this gate 110 is rendered "0" when both of the data strobe signal $\overline{DS}$ and the chip selection signal $S_c$ are "0" and when the read/write control signal R/$\overline{W}$ is also "0" (write mode). Otherwise the output signal of this gate 110 is rendered "1".

(ii) Gate 111

The output signal of this gate 111 is rendered "0" when both of the data strobe signal $\overline{DS}$ and the chip selection signal $S_c$ are "0" and when the read/write control signal R/$\overline{W}$ is "1" (read mode). Otherwise the output signal of this gate 111 is rendered "1".

(iii) Gate 112

The output signal of this gate 112 is rendered "0" when both of the data strobe signal $\overline{DS}$ and the chip selection signal $S_i$ are "0" and when the read/write control signal R/$\overline{W}$ is also "0". In other conditions, the output signal of this gate 112 is rendered "1".

(iv) Gate 113

The output signal of this gate 113 is rendered "0" when both of the data strobe signal $\overline{DS}$ and the chip selection signal $S_i$ are "0" and when the read/write control signal R/$\overline{W}$ is "1". In other conditions, the output signal of this gate 113 is rendered "1".

This device $102_i$ also comprises a four-bit register REG1 of which input terminals are connected to predetermined four bit-lines of the common data bus 103, respectively. This register REG1 stores four-bit data supplied to the input terminals thereinto when a signal fed from the output terminal $Y_0$ of the decoder DEC4 to a clock terminal CK thereof rises from "0" to "1". The data stored in this register REG1 is supplied to a decoder DEC1 which decodes the supplied data (four bits) to render one of sixteen signals $BL_0$ to $BL_{15}$ "1" in accordance with the decode result. The signals $BL_0$ to $BL_{15}$ are supplied respectively to first input terminals of sixteen AND gates $AN_0$ to $AN_{15}$ of a gate circuit 117. The second input terminals of the AND gates $AN_0$ to $AN_{15}$ are supplied respectively with the bits $D_0$ to $D_{15}$ of data on the first to sixteenth bit-lines of the common data bus 103. The gate circuit 117 further comprises an OR gate $OR_1$ for logically adding all the outputs of the AND gates $AN_0$ to $AN_{15}$. An output of this OR gate $OR_1$ is supplied to a data input terminal D of a one-bit register REG2 which stores the output of the OR gate $OR_1$ thereinto when the signal fed from the output terminal $Y_0$ of the decoder DEC2 to a clock terminal CK thereof rises from "0" to "1". The data which the register REG2 stores thereinto is that bit of the bits $D_0$ to $D_{15}$ on the common bus 103 which corresponds to the "1" signal among the signals $BL_0$ to $BL_{15}$. In other words, the data stored in the register REG2 is that bit of the bits $D_0$ to $D_{15}$ of which bit order is represented by the content of the register REG1. The data stored in the register REG2 is supplied to other circuit portions (not shown) of this device $102_i$ in which the data is used thereby.

The signals $BL_0$ to $BL_{15}$ outputted from the decoder DEC1 are also supplied respectively to first input terminals of sixteen NAND gates $NA_0$ to $NA_{15}$ of another gate circuit 118. Second input terminals of the NAND gates $NA_0$ to $NA_{15}$ are supplied from an inverter INV with an inverted signal of the signal fed from the output terminal $Y_0$ of the decoder DEC3. Output signals of the NAND gates $NA_0$ to $NA_{15}$ are supplied respectively to enable/disable terminals of sixteen buffer gates $BF_0$ to $BF_{15}$. Input terminals of the buffer gates $BF_0$ to $BF_{15}$ are supplied with an output signal of a one-bit register REG3, and output terminals of the buffer gates $BF_0$ to $BF_{15}$ are connected respectively to the first to sixteenth bit-lines of the common data bus 103. Each of the buffer gates $BF_0$ to $BF_{15}$ is of such a type that an inverted signal of its input signal is outputted when the enable/disable terminal thereof is supplied with a "0" signal, and that the output terminal is brought into a high impedance state when the enable/disable terminal is supplied with a "1" signal. Thus, which one of the buffer gates $BF_0$ to $BF_{15}$ outputs an inversion of the output signal of the register REG3 is determined by the "1" signal among the signals $BL_0$ to $BL_{15}$. In other words, the data from the register REG3 is outputted onto the common data bus 103 through that one of the buffer gates $BF_0$ to $BF_{15}$ which is selected in accordance with the data in the register REG1.

A sixteen-bit register 120 is loaded, by a circuit (not shown) provided in this device $102_i$, with data of sixteen bits which is to be sent to the CPU 101 (FIG. 1). This register 120 is enabled to output the loaded sixteen-bit data onto the first to sixteenth bit lines of the common data bus 103 when a "0" signal is supplied to an output enabling terminal $\overline{OE}$ thereof from the output terminal $Y_0$ of the decoder DEC5. There is provided another sixteen-bit register 121 which supplies data contained therein to another circuit (not shown) provided in this device $102_i$. This register 121 is loaded with the bits $D_0$ to $D_{15}$ on the common data bus 103 when a "0" signal is supplied to an input enabling terminal $\overline{IE}$ thereof from the output terminal $Y_0$ of the decoder DEC4.

The operation of the circuit of the device $102_i$ (i is any one of "1" to "n") of FIG. 2 will now be described with reference to a timing chart of FIG. 3.

(a) Transfer of data from CPU 101 to register REG1

A transfer of four-bit data from the CPU 101 to the register REG1 of the device $102_i$ is carried out in the following manner.

Figure 3:
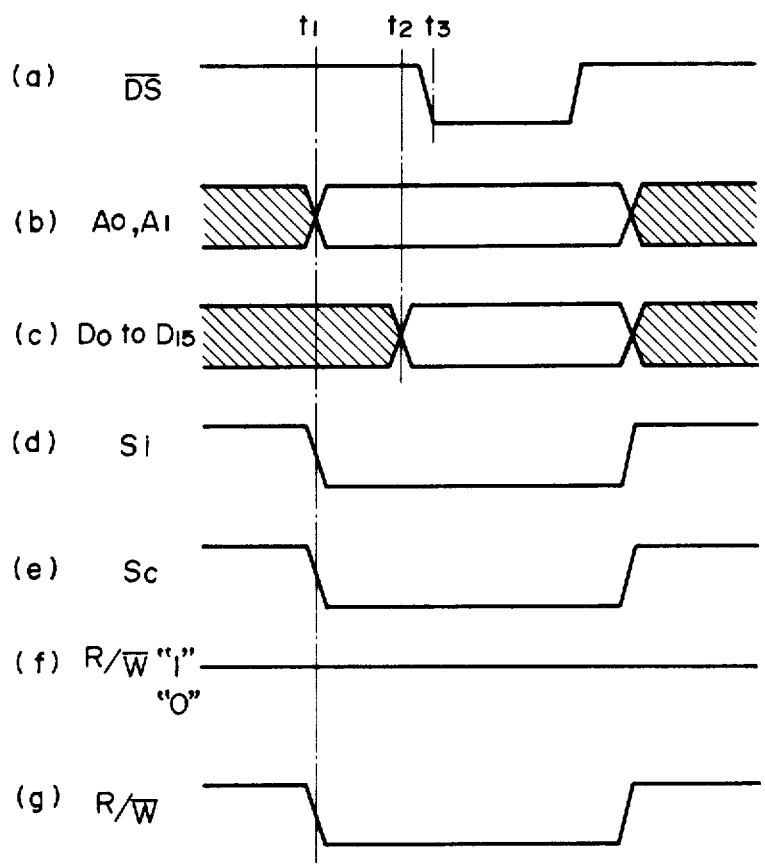
FIG. 3 is a timing chart of various signals appearing in the devices 102 of the data processing system of FIG. 1.

The CPU 101 first outputs at time $t_1$ in FIG. 3 the address data AD indicative of the device $102_i$, with which the CPU 101 desires to communicate, to the address decoder 105 (FIG. 1). As a result, the address decoder 105 outputs the chip selection signal $S_i$ at a time substantially the same as the time $t_1$ (see FIG. 3-(d)). The CPU 101 further renders the read/write control signal R/$\overline{W}$ "0" at the time $t_1$, and also renders both of the lower-order two bits $A_0$ and $A_1$ of the address data AD "0" to allow the decoder DEC4 to output a "0" signal from the output terminal $Y_0$ thereof (FIGS. 3-(b) and 3-(g)). The CPU 101 then outputs, at time $t_2$, a four-bit data to be written into the register REG1 onto the predetermined four bit-lines of the common data bus 103. The CPU 101 subsequently renders at time $t_3$ the data strobe signal $\overline{DS}$ "0", as shown in FIG. 3-(a), whereupon the gate 112 outputs a "0" signal. As a result, the decoder DEC4 outputs a "0" signal from its output terminal $Y_0$ to the clock terminal CK of the register REG1, so that the register REG1 stores the four-bit data on the common data bus 103 thereinto.

The transfer of the four bit data from the CPU 101 to the register REG1 of the device $102_i$ is performed as described above, and such transfers of data from the CPU 101 to the registers REG1 of the respective devices $102_1$ to $102_n$ are performed in the similar manner. In this case, the four-bit data written respectively into the registers REG1 of the devices $102_1$ to $102_n$ normally differ in value from one another.

When the four-bit data are stored respectively into the registers REG1 of the devices $102_1$ to $102_n$, the bit of the data on the common data bus 103 which is to be written into the register REG2 and the bit-line onto which the data in the register REG3 is outputted are determined with respect to all of the devices $102_1$ to $102_n$.

(b) Simultaneous storig of data into registers REG2 of all devices $102_1$ to $102_n$ Description will now be given as to the simultaneous storing of data into the registers REG2 of the devices $102_1$ to $102_n$.

The CPU 101 outputs at time $t_1$ in FIG. 3 the address data AD of a predetermined value to the address decoder 105 for bringing all of the devices $102_1$ to $102_n$ into operative conditions. In response to the address data AD, the address decoder 105 outputs at a time substantially the same as the time $t_1$ the chip selection signal $S_c$ to all of the devices $102_1$ to $102_n$, as shown in FIG. 3-(e). The CPU 101 further renders the read/write control signal R/$\overline{W}$ "0" at the time $t_1$, and also renders both of the lower-order two bits $A_0$ and $A_1$ of the address data AD "0" to allow the decoder DEC2 to output a "0" signal from the output terminal $Y_0$ thereof (FIGS. 3-(b) and 3-(g)). Then, the CPU 101 outputs, at time $t_2$, the data containing the bits to be written respectively into the registers REG2 onto the common data bus 103. In this case, the correspondency of the bit-lines of the common data bus 103 to the devices $102_1$ to $102_n$ is known to the CPU 101 based on the data written into the registers REG1, so that the CPU 101 outputs the bits in the desired states respectively to the bit-lines of the common data bus 103.

Then, the CPU 101 renders the data strobe signal $\overline{DS}$ "0" at time $t_3$, as shown in FIG. 3-(a), whereupon the gates 110 of the devices $102_1$ to $102_n$ output "0" signals. As a result, "0" signals are outputted from the output terminals $Y_0$ of the decoders DEC2 and supplied to the clock terminals CK of the registers REG2, respectively. Consequently, each of the registers REG2 of the devices $102_1$ to $102_n$ stores that bit of the bits $D_0$ to $D_{15}$ on the common data bus 103 which is designated by the data contained in the register REG1. Thus, each of the bits $D_0$ to $D_{15}$ is stored into a respective one of the registers REG2 of the devices $102_1$ to $102_n$.

(c) Simultaneous readout of data from registers REG3

Description will now be given as to the simultaneous readout of data by the CPU 101 from the registers REG3 of the devices $102_1$ to $102_n$.

The CPU 101 first outputs at time $t_1$ in FIG. 3 such an address data AD to the address decoder 105 that all of the devices $102_1$ to $102_n$ are simultaneously accessed. As a result, the address decoder 105 outputs the chip selection signal $S_c$ to all of the devices $102_1$ to $102_n$ at a time substantially the same as the time $t_1$, as shown in FIG. 3-(e). The CPU 101 further renders the read/write control signal R/$\overline{W}$ "1" at the time $t_1$ (FIG. 3-(f)), and also renders both of the lower-order two bits $A_0$ and $A_1$ of the address data AD "0" to allow the decoder DEC3 to output a "0" signal from the output terminal $Y_0$ thereof.

Then, the CPU 101 renders the data strobe signal $\overline{DS}$ "0" at time $t_3$, as shown in FIG. 3-(a), whereupon the gates 111 of the devices $102_1$ to $102_n$ output "0" signals. As a result, "0" signals are outputted from the output terminals $Y_0$ of the decoders DEC3 and supplied to the inverters INV of the devices $102_1$ to $102_n$, respectively. Consequently, in each of the devices $102_1$ to $102_n$, that one of the NAND gates $NA_0$ to $NA_{15}$ which is designated by the data contained in the register REG1 outputs a "0" signal to enable a corresponding one of the buffer gates $BF_0$ to $BF_{15}$ to output an inversion of the data contained in the register REG3 onto the corresponding bit-line of the common data bus 103. Thus, the data contained in the registers REG3 of the devices $102_1$ to $102_n$ are simultaneously outputted onto the respective bit-lines of the common data bus 103.

In this case, the correspondency of the bit-lines of the common data bus 103 to the devices $102_1$ to $102_n$ is known to the CPU 101 based on the data written into the registers REG1, so that the CPU 101 can discriminate the bits appearing on the common data bus 103 from on another.

(d) Transfer of sixteen-bit data from and to designated device

Description will now be given as to exchange of sixteen-bit data between the CPU 101 and a desired one of the devices $102_1$ to $102_n$, such exchange being common in data processing systems.

To readout sixteen-bit data from a desired devices $102_i$ (i is one of "1" to "n"), the CPU 101 first outputs the address data AD indicative of the desired device $102_i$ to the address decoder 105. In response to the address data AD, the address decoder 105 outputs the chip selection signal $S_i$ to the desired device $102_i$. The CPU 101 further renders the read/write control signal $R/\overline{W}$ "1" and also renders both of the lower-order two bits $A_0$ and $A_1$ of the address data AD "0" to allow the decoder DEC5 to output a "0" signal from the output terminal $Y_0$ thereof. The CPU 101 then renders the data strobe signal $\overline{DS}$ "0", whereupon a "0" signal is outputted from the output terminal $Y_0$ of the decoder DEC5 to the output enabling terminal $\overline{OE}$ of the register 120 of the designated device $102_i$. As a result, the sixteen bits of the data contained in the register 120 are outputted respectively onto the bit-lines of the common data bus 103.

To write sixteen-bit data into a desired devices $102_i$ (i is one of "1" to "n"), the CPU 101 first outputs the address data AD indicative of the desired device $102i$ to the address decoder 105. In response to the address data AD, the address decoder 105 outputs the chip selection signal $S_i$ to the desired device $102_i$. The CPU 101 further renders the read/write control signal $R/\overline{W}$ "0" and also renders the lower-order two bits $A_0$ and $A_1$ of the address data AD "1" and "0", respectively, to allow the decoder DEC4 to output a "0" signal from the output terminal $Y_1$ thereof. The CPU 101 then renders the data strobe signal $\overline{DS}$ "0", whereupon a "0" signal is outputted from the output terminal $Y_1$ of the decoder DEC4 to the input enabling terminal $\overline{IE}$ of the register 121 of the designated device $102_i$. As a result, the sixteen-bit data on the common data bus 103 is written into the register 121.

Thus, according to the above-described bus control system, a plurality of data each composed of bits less in number than the bit-lines of the common data bus 103 can be sent to or received from the plurality of devices 102 at a time. As a result, the common data bus 103 can efficiently be used even when a plurality of data each composed of a few bits must be sent through the common data bus.

What is claimed is:

1. A bus control system for use in a data processing system including a central processing unit and a plurality of peripheral devices connected to the central processing unit through a common data bus having a plurality of bit-lines, the bus control system comprising:

address decoding means for decoding address data fed from the central processing unit to selectively output a common selecting signal for bringing all the devices into operative states or one of a plurality of individual selecting signals each for bringing a respective one of the plurality of devices into an operative state;

register means provided in each of the plurality of devices and responsive to a corresponding one of the plurality of individual selecting signals for storing data appearing on predetermined ones of the bit-lines of the common data bus thereinto; and bit selection means provided in each of the plurality of devices and responsive to said common selecting signal for selecting at least one particular bit-line of the plurality of bit-lines of the common data bus as determined by the data stored in said register means of said each of the plurality of devices whereby said plurality of devices can communicate simultaneously with the central processing unit through differently selected at least one bit-lines of the common data bus.

2. A data bus control system, for use in a data processing system having a plurality of peripheral devices connected to a central processing unit through a common data bus having a plurality of bit-lines, comprising:

address decoding means for decoding address data received from the central processing unit to output a device selecting signal responsive to the received address data, the device selecting signal being a common selecting signal for bringing all the peripheral devices into operative states or one of a plurality of individual selecting signals each of which corresponds to a particular peripheral device and brings that device into an operative state;

first register means in each peripheral device responsive to the individual selecting signal corresponding to that device for storing bit selection data appearing on predetermined bit-lines of the common data bus;

decoding means in eachh peripheral device for decoding the bit selection data stored in the first register means to output a bit selection signal indicating at least one bit-line of the common data bus;

a gate circuit in each peripheral device responsive to the bit selection signal for passing data appearing on said at least one bit-line indicated by the bit selection signal; and a second register means in each peripheral device for storing the data passed through the gate circuit, the second register means responsive to the common selecting signal and a control signal from the central processing unit.

3. The data bus control system recited in claim 2, wherein the control signal from the central processing unit is a write control signal.

4. The data bus control system, for use in a data processing system having a plurality of peripheral devices connected to a central processing unit through a common data bus with a plurality of bit-lines, comprising:

address decoding means for decoding address data received from the central processing unit to output a device selecting signal responsive to the received address data, the device selecting signal being a common selecting signal for bringing all of the peripheral devices into operative states or one of a plurality of individual selecting signals each of which corresponds to a particular peripheral device and brings that device into an operative state;

first register means in each peripheral device responsive to the individual selecting signal corresponding to that device for storing bit selection data appearing on predetermined bit-lines of the common data bus;

decoding means in each peripheral device for decoding the bit selection data selection in the first register means to output a bit selection signal indicating at least one bit-line of the common data bus;

a second register means in each peripheral device for storing data to be transmitted to the central processing unit; and a gate circuit in each peripheral device responsive to the bit selection signal and a control signal from the central processing unit for outputting the data stored in said at least one second register means onto the bit-line indicated by the bit selection signal.

5. The data bus control system recited in claim 4, wherein the gate circuit further brings the non-selected bit-lines of the common data bus into high impedance states in response to the bit selection signal and the control signal from the central processing unit.

6. The data bus control system recited in claim 5, wherein the control signal is a read control signal from the central processing unit.

* * * * *